Figure 1:
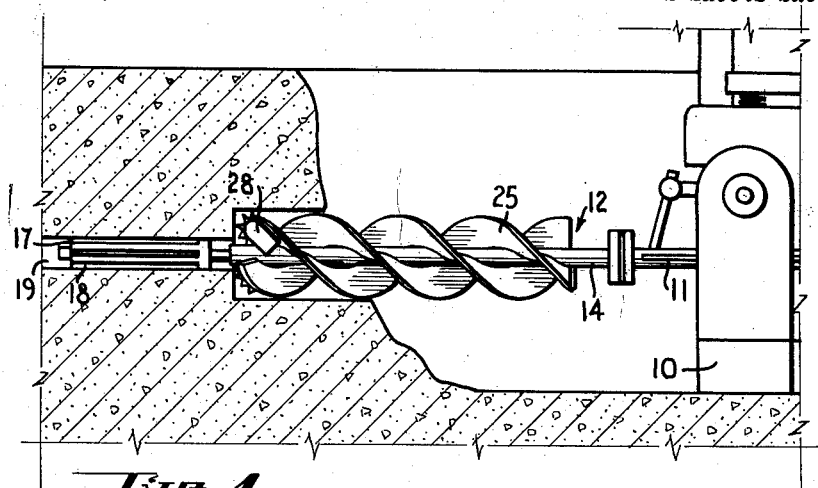

June 18, 1963  R. A. LINES  3,094,179
DEVICE FOR DRY BORING SOIL OR THE LIKE
Filed Feb. 9, 1961  2 Sheets-Sheet 1

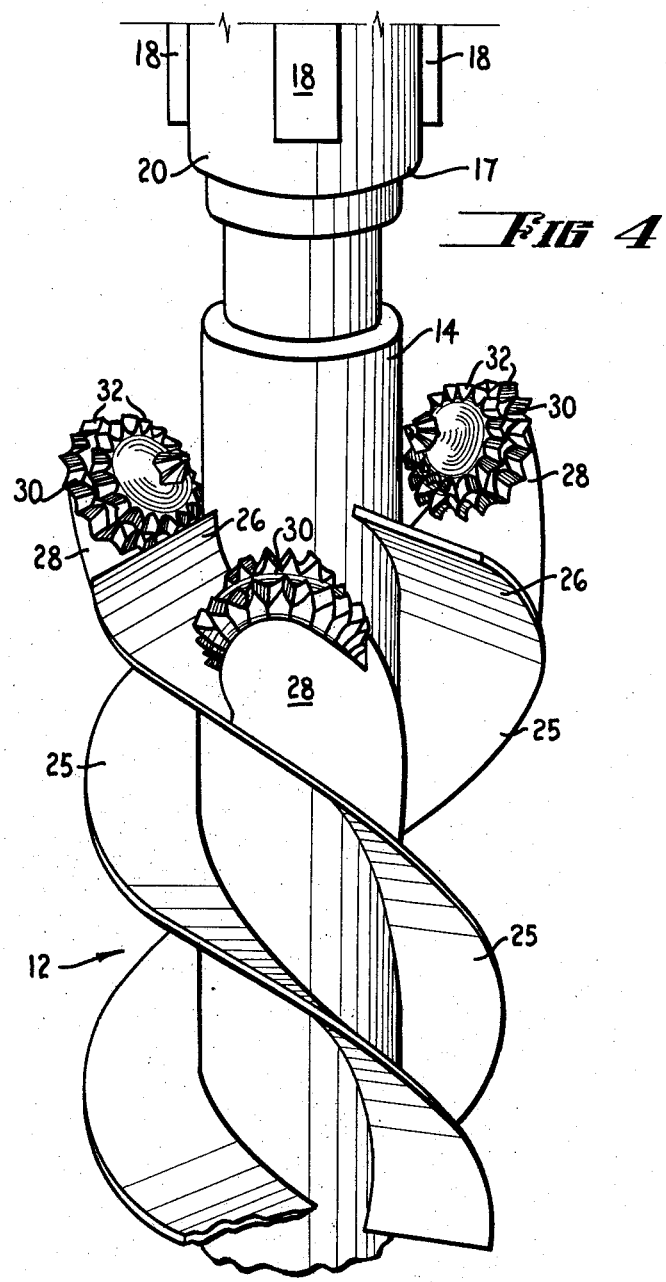

United States Patent Office 3,094,179
Patented June 18, 1963

3,094,179
DEVICE FOR DRY BORING SOIL OR THE LIKE
Raydon Ayers Lines, Woodville, South Australia, Australia (41 Boomerang Road, Croydon Park, South Australia, Australia)
Filed Feb. 9, 1961, Ser. No. 88,041
Claims priority, application Australia Feb. 11, 1960
6 Claims. (Cl. 175—394)

This invention relates to an improved device for dry boring soil or the like.

When boring holes in soil it is customary to revolve the boring member to cause cutters on the end of it to loosen the soil or rock or the like ready for removal, and to then remove this material by means of helical fins or members in the case of dry boring or by means of a stream of water in the case of wet boring.

Wet boring of wells or the like has been effected by using a cutting head consisting of a series of rotary toothed cutters mounted on shafts set angularly to the axis along which the boring is being effected, such rotary cutters operating by a percussion effect as they revolve against the face.

It is customary with this rotary type to supply a flow of water to the cutting head, which water flow washes away the spoil cut from the face.

However, even with the use of water, the cutting end of a boring tool of this type tends to "wander," and complicated means and methods are employed in an attempt to bore a straight hole.

It has also been known to utilize a series of fixed hard cutters fixed to the end of the boring head and to associate these cutters with the helical blades which move the spoil rearwardly at the cutters are driven into the face, this latter type of construction being used where quantities of water could not be pumped into and through the hole being bored, and therefore the dry type of cutting is usually used for under road boring or the like either with or without pilot holes and also for post holes boring where only short distances are involved. However, the fixed cutter type of boring tool requires more power to drive it and cuts more unevenly than the rotary cutter type of tool.

It is the main object of this invention to combine the advantages of the helical blade tool and the rotary cutters.

It is a second object of the invention to provide a means of boring a straight hole.

According to its simplest form, the invention comprises an improved device for dry boring soil or the like which includes a central shaft, spindles spaced around the central shaft, helical blades extending along the central shaft, and toothed cutters on the spindles, the toothed cutters being freely rotatable and disposed forwardly of the leading ends of the helical blades.

In my Australian Patent No. 158,036, I disclosed a bit for drilling holes which is characterized by cutting edges at its end which are continuous outwards from the axis of rotation, but each has two angles sloping back from a point positioned outward from the axis. A wide experience in a large variety of soils has proved that a very straight hole can be bored utilizing such a bit, provided its diameter is not great (say between two and five inches).

Figure 2:
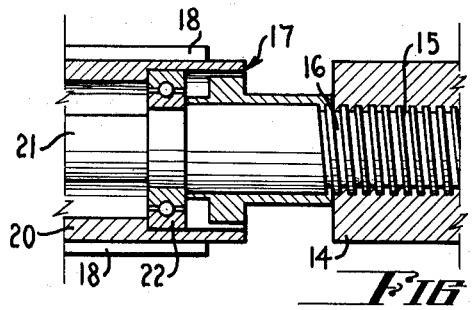
Figure 3:
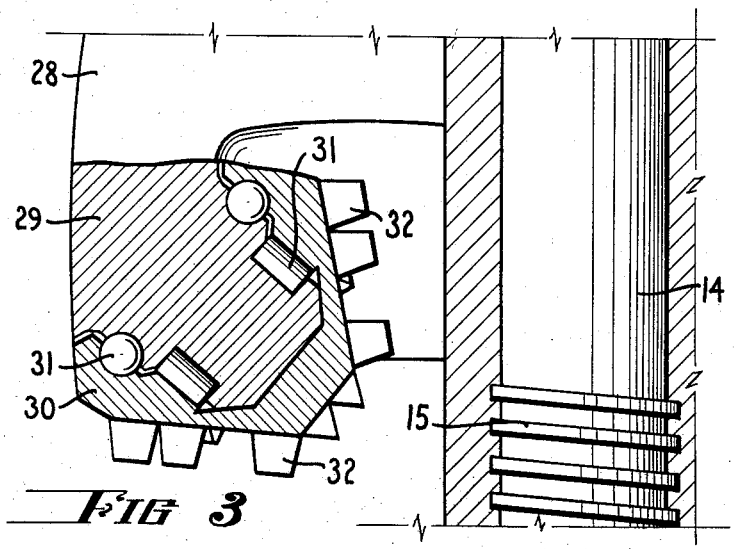

The invention is described hereunder in further detail with reference to an embodiment which is illustrated in the accompanying drawings, in which:

FIG. 1 is an elevational view showing a device according to this invention cutting a hole, FIG. 2 is an enlarged sectional view showing the guide member secured to the end of the central shaft of the device, FIG. 3 is a section through a rotary cutter, and FIG. 4 is a fragmentary perspective view of the leading end of the device.

A power driven machine 10 drives a splined output shaft 11 which is axially movable while it is rotationally driven so as to feed the dry boring device 12 inwardly as it also is driven.

The dry boring device 12 comprises a central shaft 14 which is hollow in form and is threaded at its end 15 so as to engage a rearwardly extending stem 16 of a guide member 17. The guide member 17 is formed with four spaced ribs 18 which extend along most of its length so as to engage a pilot hole 19 but to resist any tendency to turn within the pilot hole 19.

The outer portion 20 of the guide member 17 is journalled to a central spindle 21 by the bearings 22 so that the central shaft 14 is relatively rotational with respect to the guide member 17. The rearwardly extending stem 16 is an extension of the central spindle 21.

The central shaft 14 has extending for most of its length three helical blades 25, the helical blades constituting soil feed means to feed soil outwardly from their leading edges 26 when the device is in use. Secured to each of these helical blades 25 and also to the central shaft 14 is a plurality of blocks 28, each block 28 being formed with a spindle 29 which projects inwardly towards the axis of the central shaft 14 at an angle of forty-five degrees. The blocks 28 are each of curved shape and as shown in FIGS. 3 and 4, the securing faces of these blocks are disposed contiguous with both the shaft 14 and the blades 25, each block being welded to both these members.

A rotary cutter 30 is journalled to each spindle 29 through the bearings 31 so that each rotary cutter 30 is freely rotatable on its spindle 29. Each rotary cutter 30 is formed with a plurality of outwardly projecting teeth 32, and the leading teeth are disposed substantially at right angles to the axis to the central shaft 14, and are also in advance of the leading edges 26 of the helical blades 25.

FIGS. 3 and 4 show slightly different configurations of the rotary cutters 30, the cutters shown in FIG. 4 having inner teeth the leading edges of which are disposed rearwardly of the outer teeth, but it will be clear that the configuration of the teeth can be widely varied within this invention. The cutters 30 are retained on the spindles 29 by the balls of the bearing 31 in accordance with the usual practice.

Each block 28 is disposed against the face of a helical blade 25 in such a way that upon rotation of the central shaft 14, the teeth 32 of the rotary cutters 30 will spill broken up soil, rock or the like into the space between a pair of adjacent blades 25 in such a way that this spoil will not tend to pack.

From the drawings of FIGS. 1 and 4 it will be seen that the pitch of the helical blades 25 is comparatively short, and this is desirable to ensure good feeding of the spoil.

In this specification the term "dry boring" does not exclude the use of small quantities of water, which may be used in some circumstances at the discretion of an operator, but it will be seen that the huge volume of water or mud which would otherwise be required for a horizontal or near horizontal hole can be dispensed with.

What I claim is:

1. A device for dry boring soil comprising:
   a central shaft adapted for rotation about a longitudinal axis,
   a plurality of circumferentially spaced spindles around the central shaft and inclined inwardly towards the axis, toothed cutters supported for free rotation on said spindles, and a plurality of blades each having a leading end and extending rearwardly in helical fashion along said shaft, said blades having an inner edge fixed to said shaft end and a free outer edge, each said blade having a width which is several times greater than the thickness thereof, the outer edge of the blades defining a diameter several times greater than the diameter of the shaft whereby said blades constitute dry soil feed means, said toothed cutters including leading teeth disposed forwardly of the leading ends of the blades, each of the cutters being disposed between a pair of adjacent blades and spaced from one of said blades whereby the leading teeth spill soil broken up thereby into the space between the adjacent pair of blades upon rotation of said cutters.

2. A device for dry boring soil comprising:

a central shaft adapted for rotation about a longitudinal axis, a plurality of circumferentially spaced spindles around the central shaft inclined inwardly towards the central shaft axis, toothed cutters freely rotatable on said spindles, a central guide member on the central shaft projecting forwardly of said cutters, and a plurality of blades each having a leading end and extending rearwardly in helical fashion along said central shaft, said blades having an inner edge fixed to said central shaft and a free outer edge, each said blade having a width which is several times greater than the thickness thereof, the outer edges of said blades defining an outer diameter which is several times greater than the diameter of said central shaft whereby said blades constitute dry soil feed means, said toothed cutters including leading teeth disposed forwardly of said leading ends of the blades, each of said toothed cutters being disposed between a pair of adjacent blades and spaced from one of said blades whereby said leading teeth spill soil broken up thereby into the space between the adjacent pair of blades upon rotation of said cutters.

3. A device for dry boring soil comprising:

a central shaft adapted for rotation about a longitudinal axis, a plurality of circumferentially spaced spindles around the central shaft inclined inwardly towards the central shaft axis, toothed cutters freely rotatable on said spindles, a central guide member on the central shaft projecting forwardly of said cutters, whereby when said guide member is engaged in a pilot hole in the soil, said cutters are operable to remove soil concentrically around the hole, and a plurality of blades each having a leading end and extending rearwardly in helical fashion along said shaft, said blades having an inner edge fixed to said shaft and a free outer edge, each said blade having a width which is several times greater than the thickness thereof, the outer edge of the blades defining a diameter several times greater than the diameter of the shaft whereby said blades constituted dry soil feed means, said toothed cutters including leading teeth disposed forwardly of the leading ends of the blades, each of the cutters being disposed between a pair of adjacent blades and spaced from one of said blades whereby the leading teeth spill soil broken up thereby into the space between the adjacent pair of blades upon rotation of said cutters.

4. A device for dry boring soil comprising:

a central shaft adapted for rotation about a longitudinal axis, a plurality of circumferentially spaced spindles around said central shaft inclined inwardly towards the central shaft axis, toothed cutters freely rotatable on said spindles, each said cutter being of bevel shape and including leading teeth substantially at right angles to the axis of said central shaft, and a plurality of blades each having a leading end and extending rearwardly in helical fashion along said shaft, said blades having an inner edge fixed to said shaft and a free outer edge, each said blade having a width which is several times greater than the thickness thereof, the outer edge of the blades defining a diameter several times greater than the diameter of the shaft whereby said blades constitute dry soil feed means, the leading teeth of said toothed cutters being disposed forwardly of said leading ends of the blades, each of said toothed cutters being disposed between a pair of adjacent blades and spaced from one of said blades whereby said leading teeth spill soil broken up thereby into the space between the adjacent pair of blades upon rotation of said cuters.

5. A device for dry boring soil comprising:

a central shaft adapted for rotation about a longitudinal axis, a plurality of circumferentially spaced spindles around the central shaft inclined inwardly towards the central shaft axis, toothed cutters freely rotatable on said spindles, each said cutter being of bevel shape and including leading teeth substantially at right angles to the axis of said central shaft, and a plurality of blades each having a leading end and extending rearwardly in helical fashion along said shaft, said blades having an inner edge fixed to said shaft and a free outer edge, each said blade having a width which is several times greater than the thickness thereof, the outer edge of the blades defining a diameter several times greater than the diameter of the shaft whereby said blades constitute dry soil feed means, the leading teeth of said toothed cutters being disposed forwardly of said leading ends of the blades, each of said toothed cutters being disposed between a pair of adjacent blades and spaced from one of said blades whereby said leading teeth spill soil broken up thereby into the space between the adjacent pair of blades upon rotation of said cutters, and a central guide member journalled to said central shaft and projecting forwardly of said cutters.

6. A device for dry boring soil comprising:

a central shaft adapted for rotation about a longitudinal axis, a plurality of circumferentially spaced spindles around the central shaft inclined inwardly towards the central shaft axis, toothed cutters of bevel shape freely rotatable on said spindles, a guide member spindle threadably engaging said central shaft and projecting forwardly of the cutters, a guide member journalled on said spindle, longitudinally extending ribs on said guide member, and a plurality of blades each having a leading end and extending rearwardly in helical fashion along said shaft, said blades having an inner edge fixed to said shaft and a free outer edge, each said blade having a width which is several times greater than the thickness thereof, the outer edge of the blades defining a diameter several times greater than the diameter of the shaft whereby said blades constitute dry soil feed means, said toothed cutters including leading teeth disposed forwardly of said leading ends of the blades and substantially at right angles to said shaft, each of said toothed cutters being disposed between a pair of adjacent blades and spaced from one of said blades, whereby when said guide member is engaged in a pilot hole in the soil said leading teeth spill soil broken up thereby concentric with said pilot hole into the space between the adjacent pair of blades upon rotation of said cutters.

References Cited in the file of this patent

UNITED STATES PATENTS

| | | |
|---|---|---|
| 1,026,886 | Thomas | May 21, 1912 |
| 1,224,930 | Hughes | May 8, 1917 |
| 1,719,546 | Hallet | July 2, 1929 |
| 1,729,063 | Bull | Sept. 24, 1929 |
| 1,821,473 | Mercer | Sept. 1, 1931 |
| 2,688,463 | Bettes | Sept. 7, 1954 |
| 2,702,180 | Horner | Feb. 15, 1955 |
| 2,741,462 | Baca | Apr. 10, 1956 |
| 2,746,719 | Seligman | May 22, 1956 |
| 2,781,185 | Robbins | Feb. 12, 1957 |
| 2,829,864 | Knapp | Apr. 8, 1958 |
| 2,898,089 | Hammer | Aug. 4, 1959 |

FOREIGN PATENTS

| | | |
|---|---|---|
| 212,712 | Australia | June 20, 1958 |